No. 805,492. PATENTED NOV. 28, 1905.
P. F. SEIDEL.
HOG SCALDING AND SCRAPING MACHINE.
APPLICATION FILED SEPT. 21, 1904.
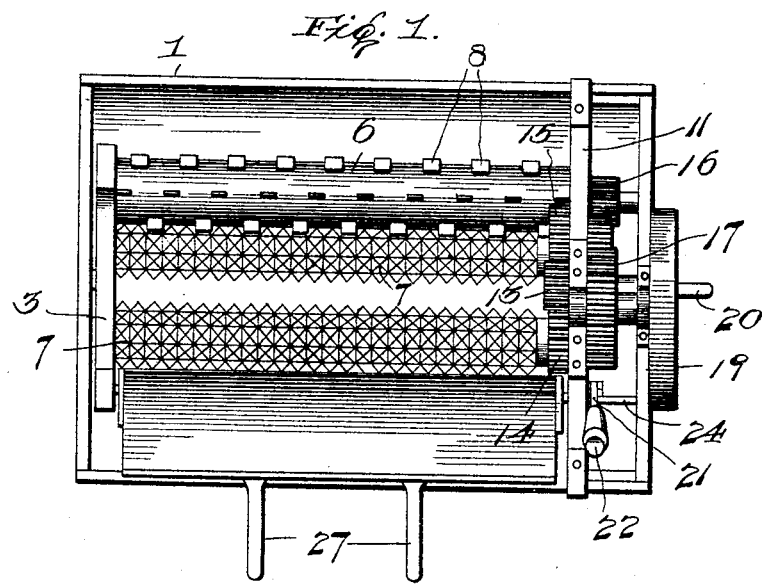
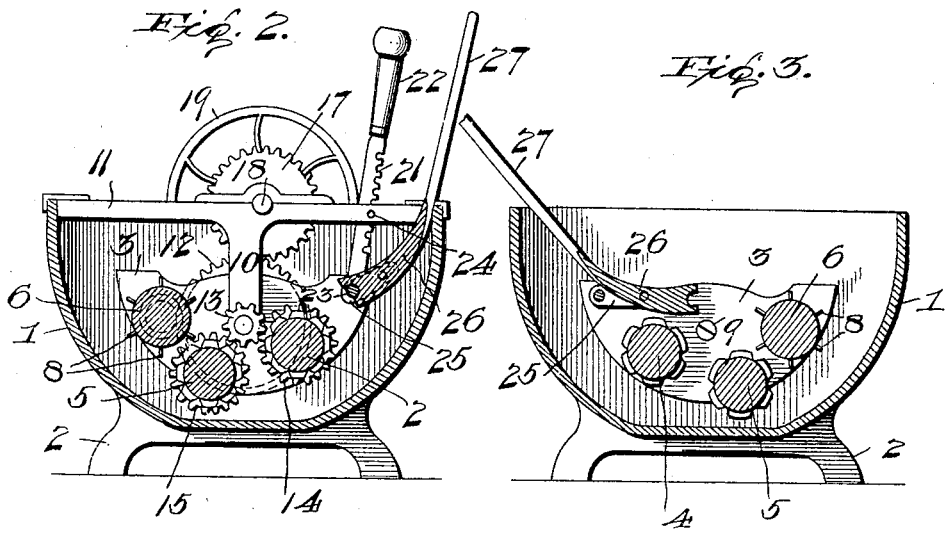
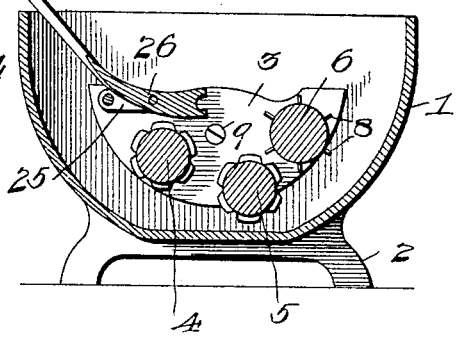
WITNESSES:
INVENTOR
PETER F. SEIDEL
By Rexford M. Smith, Attorney.

UNITED STATES PATENT OFFICE.

PETER F. SEIDEL, OF PINEGROVE, PENNSYLVANIA.

HOG SCALDING AND SCRAPING MACHINE.

No. 805,492.  Specification of Letters Patent.  Patented Nov. 28, 1905.

Application filed September 21, 1904. Serial No. 225,358.

*To all whom it may concern:*

Be it known that I, PETER F. SEIDEL, a citizen of the United States of America, residing at Pinegrove, in the county of Schuylkill and State of Pennsylvania, have invented a certain new and useful Hog Scalding and Scraping Machine, of which the following is a specification, reference being had therein to the accompanying drawings.

This invention relates to hog scalding and scraping machines, the object of the invention being to simplify and improve the construction illustrated in my former patent, No. 329,683, dated November 3, 1885.

The primary object of the present invention is to provide what may be termed a tilting and adjustable "cradle" which embodies in its structure a plurality of rolls, one of which operates as a rotary scraper for removing the bristles from the animal and also to turn the body of the animal so that every portion of the same may be subjected to the action of the scraping-roller. The object of employing a tilting cradle is to enable the animal to be submerged to any desired extent in the boiling water contained in the tank or trough in which the cradle is mounted. The construction hereinafter described also is adapted to operate with equal efficacy on animals of different sizes.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a plan view of a hog scalding and scraping machine embodying the present invention. Fig. 2 is a vertical transverse section through the same, taken in line with a portion of the gearing. Fig. 3 is a similar section taken about centrally of the machine.

Like reference-numerals designate corresponding parts in all figures of the drawings.

The machine in its structure comprises, essentially, a trough or tank 1, adapted to contain a suitable quantity of hot water for the purpose of partially submerging and scalding the animal in the manner hereinafter described. By preference the tank or trough 1 is composed of metal and mounted upon suitable supporting-legs 2, so that a fire may be placed beneath the same to heat the water contained in the tank. However, the tank may be composed of wood or other suitable material and water in a heated or boiled condition poured into the trough.

Arranged within the trough is what I term a "cradle" for supporting the animal. This cradle comprises, essentially, the end pieces or rockers 3, set at a suitable distance apart, and a plurality of rolls 4 and 5 and 6, which form the bottom of the cradle, the rolls 4 and 5 being toothed, as shown at 7, so that while adapted to support the body of the animal they also operate to turn the animal over and over, thus presenting all parts of the animal to the scraping action of the roll 6. The last-named roll 6 is provided with scraping teeth or blades 8, projecting from the periphery thereof and having straight scraping edges parallel to the axis of the roll, which teeth or blades operate directly in contact with the body of the animal as the latter rests and turns upon the rolls 4 and 5.

The scraping-roll 6 is driven at a considerably higher speed than the turning and supporting rolls 4 and 5, and in order that all of the rolls may simultaneously be driven under any adjustment of the cradle as a whole the cradle is mounted upon a shaft or trunnions 9, one of which is journaled in the pendent arm 10 of a cross-bar 11, extending across the top of the trough or tank near one end thereof, the said shaft or trough 9 being provided with a master-gear 12 and also with a pinion 13, both the gear and pinion being fast on the shaft or trunnion 9 and arranged on opposite sides of the bearing-arm 10, as clearly shown in Figs. 1 and 2. The pinion 13 meshes directly with gears 14 and 15, mounted fast upon the ends of the turning-rolls 4 and 5, respectively, while the master-gear 12 meshes with a pinion 16, fast on the end of shaft of the scraping-roll 6. By regulating the relative sizes of said gears or pinions any desired relative speed may be given to the scraping-rolls as compared with the turning-rolls. The master-gear 12 is actuated by means of a driving-gear 17, mounted on a counter-shaft 18, journaled in or on the cross-bar 11 and provided with a driving-wheel 19, which may either be of the form adapted to receive a belt from a suitable motor or said wheel may be provided with a handle 20, by means of which the machine may be operated by hand.

The mechanism for tilting and adjusting the cradle consists, preferably, of a rack-bar 21, provided with a suitable handle 22 and connected pivotally at one end to one of the rockers 3, as shown at 23. Extending between the cross-bar 11 and the adjacent end of the tank or trough 1 is a pin 24, with which any of the teeth of the rack-bar 21 are adapted to engage, so that by moving the rack-bar up or down the cradle may be tilted to any desired angle and held at such angle by reëngaging the rack-bar with the pin 24. By thus tilting the cradle the supporting and turning rolls 4 and 5 may be correspondingly raised and lowered for the purpose of adapting the machine to hogs of different sizes and regulating the extent to which said animals are submerged in the scalding-water.

Arranged at one side of the machine and connected with the cradle by means of pivotal and swinging links 25 is a combined skid and lifter 26, provided with one or more operating-handles 27. This skid is preferably of concavo-convex form, with its concave form uppermost when acting as a skid or lifter, as shown, respectively, in Figs. 2 and 3. The links 25 connect pivotally at one end to the rockers, while they connect pivotally at their opposite ends to the skid 26, thus adapting said skid to be swung outward, as shown in Figs. 1 and 2, to allow the animal to be placed thereon preparatory to sliding the same upon the rolls 4 and 5 or inward, as shown in Fig. 3, when it is desired to lift the animal out of the scalding-water after the scraping operation has been completed.

After the animal has been slid off the skid upon the supporting-rolls the skid may be turned over so as to present the concave side thereof downward, whereupon the operator may press downward on the handles 27 and maintain the animal in close contact with all of the rolls during the scraping operation.

Having thus described the invention, what is claimed as new is—

1. A hog scalding and scraping machine comprising a trough or tank, a tilting cradle mounted therein and embodying body-turning rolls, and a hide-scraping roll, and means for tilting said cradle consisting of a movable rack-bar connected with the cradle, and an engaging device coöperating with the rack-bar.

2. A hog scalding and scraping machine comprising a trough or tank, a cradle mounted therein, and embodying body-turning rolls, a hide-scraping roll, and rockers in which said rolls are journaled, cradle tilting and adjusting mechanism, a master-gear, a pinion on the scraping-roll meshing therewith, a pinion on the shaft of the master-gear, gears on the turning-rolls meshing with the last-named pinion, and means for driving said master-gear.

In testimony whereof I affix my signature in presence of two witnesses.

PETER F. SEIDEL.

Witnesses:
 WILLIAM E. FELTY,
 A. M. ZIMMERMAN.